US008983436B2

(12) United States Patent
Tiwari

(10) Patent No.: US 8,983,436 B2
(45) Date of Patent: Mar. 17, 2015

(54) METHOD OF HANDLING A MOBILITY MANAGEMENT BACK-OFF TIMER AND RELATED COMMUNICATION DEVICE

(71) Applicant: HTC Corporation, Taoyuan County (TW)

(72) Inventor: Kundan Tiwari, Taoyuan County (TW)

(73) Assignee: HTC Corporation, Taoyuan District, Taoyuan (TW)

( * ) Notice: Subject to any disclaimer, the term of this patent is extended or adjusted under 35 U.S.C. 154(b) by 0 days.

(21) Appl. No.: 13/831,878

(22) Filed: Mar. 15, 2013

(65) Prior Publication Data

US 2013/0203389 A1 Aug. 8, 2013

Related U.S. Application Data

(62) Division of application No. 13/561,087, filed on Jul. 30, 2012.

(60) Provisional application No. 61/512,922, filed on Jul. 29, 2011.

(51) Int. Cl.

| | |
|---|---|
| ***H04M 1/66*** | (2006.01) |
| ***H04W 8/16*** | (2009.01) |
| ***H04W 12/06*** | (2009.01) |
| ***H04W 4/22*** | (2009.01) |
| ***H04W 76/02*** | (2009.01) |
| *H04W 68/00* | (2009.01) |
| *H04W 76/00* | (2009.01) |

(52) U.S. Cl.
CPC ................ *H04W 8/16* (2013.01); *H04W 12/06* (2013.01); *H04W 4/22* (2013.01); *H04W 76/027* (2013.01); *H04W 68/00* (2013.01); *H04W 76/007* (2013.01)
USPC .......................................................... 455/411

(58) Field of Classification Search
USPC ............................ 455/411; 380/278; 713/168
See application file for complete search history.

(56) References Cited

U.S. PATENT DOCUMENTS

2012/0002545 A1 1/2012 Watfa
2012/0218889 A1* 8/2012 Watfa et al. .................. 370/230
2012/0314562 A1* 12/2012 Zhao et al. .................. 370/216

OTHER PUBLICATIONS

3GPP TS 23.060 V10.3.0 (Mar. 2011) Technical Specification 3rd Generation Partnership Project; Technical Specification Group Services and System Aspects; General Packet Radio Service (GPRS); Service description; Stage 2 (Release 10).
3GPP TSG CT WG1 Meeting #72 C1-112618 Title:Establishing emergency services when T3246 or T3346 is running Shanghai (P.R. China), Jun. 27-Jul. 1, 2011 CR-Form-v9.9 Change Request 24.008 CR1862 rev—Current version: 10.3.0.
Office action mailed on Jul. 19, 2013 for the U.S. Appl. No. 13/561,087, filed Jul. 30, 2012, p. 1-7.

* cited by examiner

*Primary Examiner* — Kwasi Karikari
(74) *Attorney, Agent, or Firm* — Winston Hsu; Scott Margo

(57) ABSTRACT

A method of handling a mobility management back-off timer for a mobile device in a wireless communication system comprises performing a mobility management procedure in response to a paging signaling transmitted by a network of the wireless communication system; and stopping the mobility management back-off timer after performing an authentication procedure in the mobility management procedure successfully.

3 Claims, 4 Drawing Sheets

40

Start 400

Initiate an emergency session with the network, when the mobility management back-off timer is running 402

Stop the mobility management back-off timer, when the network initiates a session management procedure for an access point name (APN) with the UE during the emergency session 404

End 406

METHOD OF HANDLING A MOBILITY MANAGEMENT BACK-OFF TIMER AND RELATED COMMUNICATION DEVICE

CROSS REFERENCE TO RELATED APPLICATIONS

This application is a divisional application of U.S. application Ser. No. 13/561,087, filed on Jul. 30, 2012, which claims the benefit of U.S. Provisional Application No. 61/512,922, filed on Jul. 29, 2011 and entitled "Method to handling of back off timer in case of network initiated procedure".

BACKGROUND OF THE INVENTION

1. Field of the Invention

The present invention relates to a method used in a wireless communication system and related communication device, and more particularly, to a method of handling a mobility management back-off timer and related communication device.

2. Description of the Prior Art

The 3rd Generation Partnership Project (3GPP) has developed a universal mobile telecommunications system (UMTS) which adopts a wideband code division multiple access (WCDMA) as a wireless air interface. In the UMTS, a radio access network known as a universal terrestrial radio access network (UTRAN) includes multiple Node-Bs (NBs) for communicating with multiple user equipments (UEs) (i.e., mobile stations (MSs)). As a successor of a General Packet Radio Service (GPRS) system, the UMTS provides high frequency spectrum utilization, universal coverage, and high-speed multimedia data transmission which are beneficial for the UEs and the NBs of the UMTS. Please note that, the UMTS and the GPRS system can support both a packet-switch (PS) service and a circuit-switch (CS) service, while systems older than the GPRS system support only the CS service.

A long-term evolution (LTE) system supporting the 3GPP Rel-8 standard and/or the 3GPP Rel-9 standard are developed by the 3GPP as a successor of the UMTS, for further enhancing performance of the UMTS to satisfy increasing needs of users. The LTE system includes a new radio interface and a new radio network architecture that provides a high data rate, low latency, packet optimization, and improved system capacity and coverage. In the LTE system, a radio access network known as an evolved UTRAN (E-UTRAN) includes multiple evolved Node-Bs (eNBs) for communicating with multiple UEs, and communicating with a core network (e.g., evolved packet core (EPC) network) including a mobility management entity (MME), a serving gateway, etc., for Non Access Stratum (NAS) control.

A LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint transmission/reception (CoMP), uplink (UL) multiple-input multiple-output (MIMO), etc. For a UE and an eNB to communicate with each other in the LTE-A system, the UE and the eNB must support standards developed for the LTE-A system, such as the 3GPP Rel-10 standard or later versions.

In the abovementioned systems, congestion of a network (i.e., the radio access network and/or the core network) can be controlled by using a mobility management back-off timer. That is, when a UE transmits a signaling (e.g., for initiating a procedure/session) to the network, the network replies a rejection signaling including the mobility management back-off timer if the network is in congestion. The UE can retransmit the signaling, after the mobility management back-off timer expires (i.e., stops running). Alternatively, the UE can stop the mobility management back-off timer, when the network transmits a paging signaling (e.g., for initiating a procedure/session) to the UE. That is, the mobility management back-off timer can be stopped by the network-initiated procedure.

However, when a fake network (e.g., fake eNB or fake core network) transmits paging signalings (i.e., fake signalings) to UEs, the UEs may stop mobility management back-off timers and start to perform procedures corresponding to the paging signalings. Then, the congestion of the network (i.e., the true network) is deteriorated, and the network can not operate regularly for a long time.

On the other hand, a UE is allowed to initiate an emergency session (e.g., for making an emergency call), when the mobility management back-off timer is running (i.e., not expired). During the emergency session, it is possible that the congestion of the network is mitigated or eliminated, and the network may initiate a session management procedure for an access point name (APN) with the UE. In this situation, since the mobility management back-off timer is still running, and the UE cannot respond to the session management procedure, i.e., replying one or more signalings for performing the session management procedure. Thus, the UE may loss ongoing radio bearer when changing a routing area. Alternatively, the UE cannot resume a service after the emergency session, since the mobility management back-off timer is not stopped.

Therefore, how to solve abovementioned problems is a topic to be discussed and addressed.

SUMMARY OF THE INVENTION

The present invention therefore provides a method and related communication device for handling a mobility management back-off timer to solve the abovementioned problem.

A method of handling a mobility management back-off timer for a mobile device in a wireless communication system is disclosed. The method comprises performing a mobility management procedure in response to a paging signaling transmitted by a network of the wireless communication system; and stopping the mobility management back-off timer after performing an authentication procedure in the mobility management procedure successfully.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
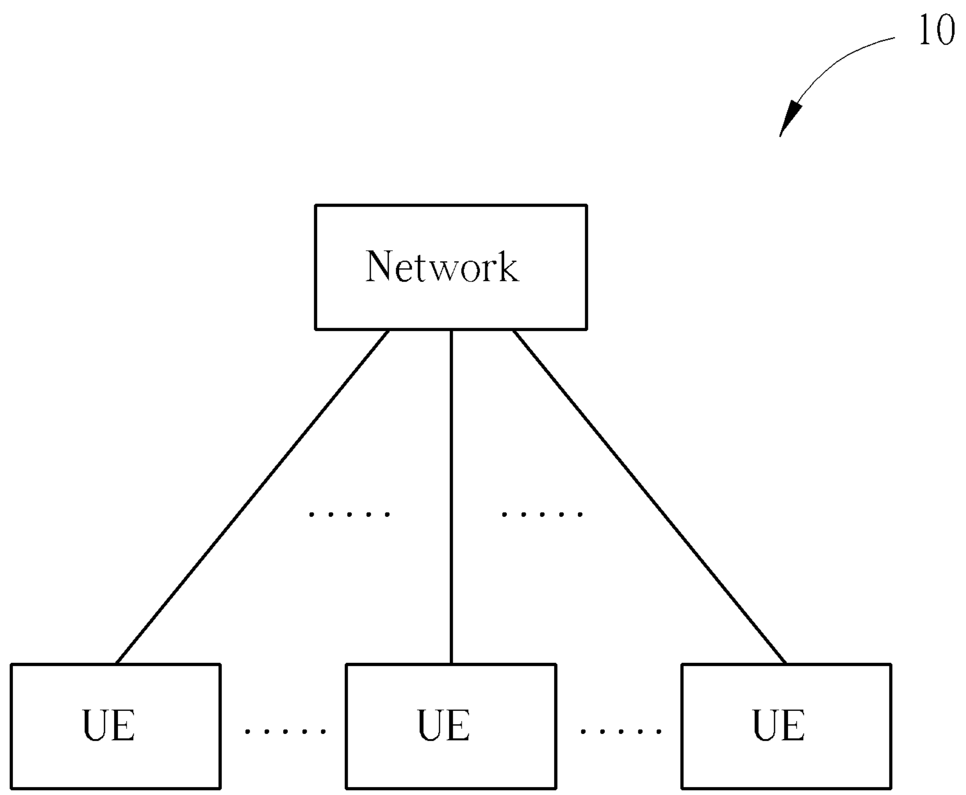
FIG. 1 is a schematic diagram of a wireless communication system according to an example of the present invention.

Please refer to FIG. 1, which is a schematic diagram of a wireless communication system 10 according to an example of the present invention. The wireless communication system 10 is briefly composed of a network and a plurality of user equipments (UEs). In FIG. 1, the network and the UEs are simply utilized for illustrating the structure of the wireless communication system 10. Practically, the network can be a universal terrestrial radio access network (UTRAN) comprising a plurality of Node-Bs (NBs) in a universal mobile telecommunications system (UMTS). Alternatively, the network can be an evolved UTRAN (E-UTRAN) comprising a plurality of evolved NBs (eNBs) and/or relays in along term evolution (LTE) system or a LTE-Advanced (LTE-A) system.

Furthermore, the network can also include both the UTRAN/E-UTRAN and a core network (e.g., an evolved packet core (EPC) network), wherein the core network includes network entities such as a Mobility Management Entity (MME), a Serving Gateway (S-GW), a Packet Data Network (PDN) Gateway (P-GW), and/or a local gateway (L-GW). In other words, after the network receives information (e.g., message, signaling and/or packet) transmitted by a UE, the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. Besides, the information can be processed by both the UTRAN/E-UTRAN and the core network, and the decisions are made after coordination and/or cooperation are performed by the UTRAN/E-UTRAN and the core network.

Figure 2:
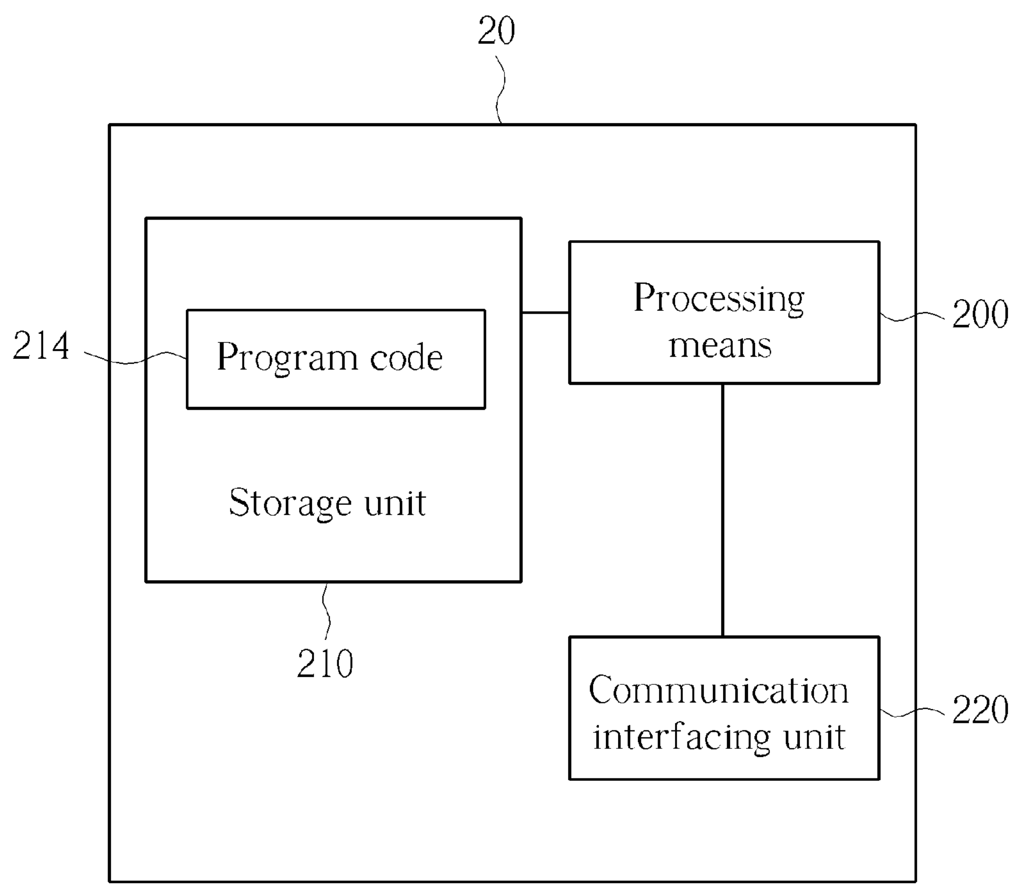
FIG. 2 is a schematic diagram of a communication device according to an example of the present invention.

Please refer to FIG. 2, which is a schematic diagram of a communication device 20 according to an example of the present invention. The communication device 20 can be a UE or the network shown in FIG. 1, but is not limited herein. The communication device 20 may include a processing means 200 such as a microprocessor or an Application Specific Integrated Circuit (ASIC), a storage unit 210 and a communication interfacing unit 220. The storage unit 210 may be any data storage device that can store a program code 214, accessed by the processing means 200. Examples of the storage unit 210 include but are not limited to a subscriber identity module (SIM), read-only memory (ROM), flash memory, random-access memory (RAM), CD-ROM/DVD-ROM, magnetic tape, hard disk, and optical data storage device. The communication interfacing unit 220 is preferably a radio transceiver, and can transmit and receive wireless signals according to processing results of the processing means 200.

Figure 3:
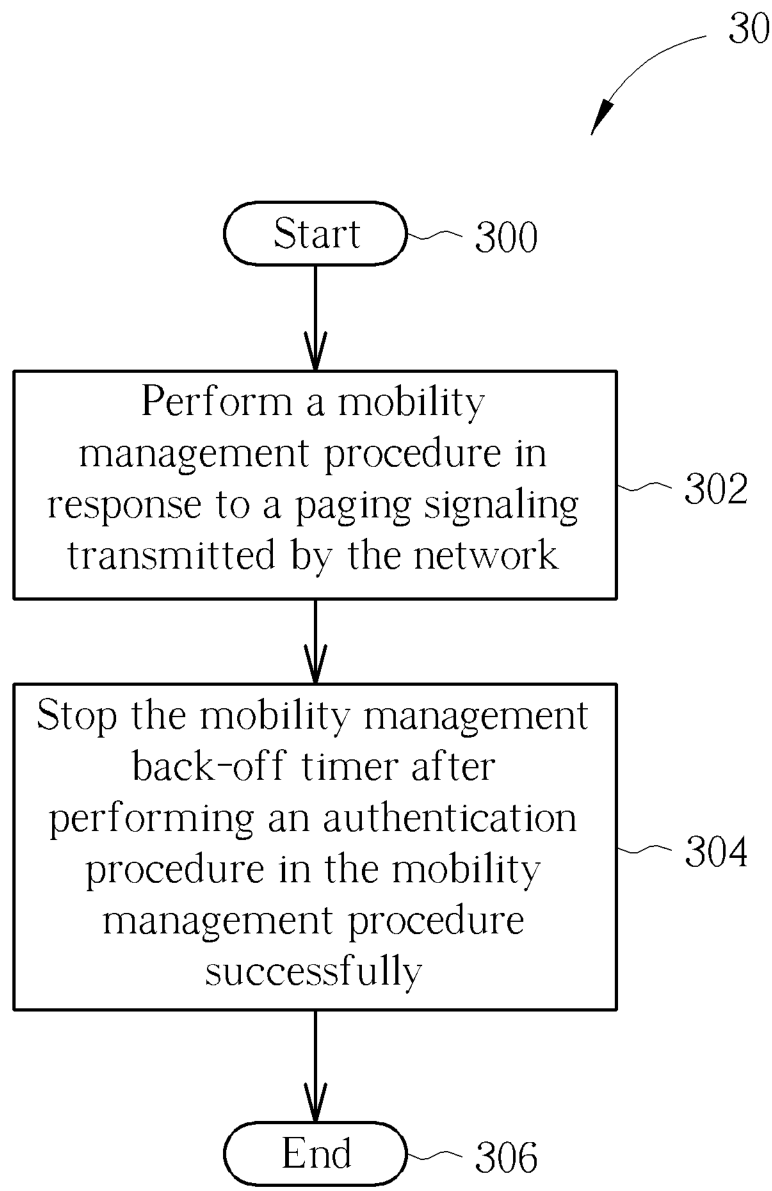
FIG. 3 is a flowchart of a process according to an example of the present invention.

Please refer to FIG. 3, which is a flowchart of a process 30 according to an example of the present invention. The process 30 is utilized in a UE shown in FIG. 1, for handling a mobility management back-off timer. The process 30 may be compiled into the program code 214 and includes the following steps:

Step 300: Start.

Step 302: Perform a mobility management procedure in response to a paging signaling transmitted by the network.

Step 304: Stop the mobility management back-off timer after performing an authentication procedure in the mobility management procedure successfully.

Step 306: End.

According to the process 30, after the UE receives a paging signaling transmitted by the network, the UE performs a mobility management procedure in response to the paging signaling. The UE stops the mobility management back-off timer after performing an authentication procedure in the mobility management procedure successfully. That is, the UE does not simply stops the mobility management back-off timer after receiving the paging signaling but stops the mobility management back-off timer after performing the authentication procedure successfully during the mobility management procedure. Thus, the UE will not stop the mobility management back-off timer in response to a paging signaling transmitted by a fake network, i.e., a fake signaling. As a result, congestion of the network will not be deteriorated.

Please note that, realization of the process 30 is not limited. For example, the mobility management back-off timer is a T3246 timer or a T3346 timer defined in the 3GPP standard. Further, the UE can determine that the authentication procedure is performed successfully, after receiving a security mode command from the network, for enabling a plurality of security parameters obtained during the authentication procedure. Besides, the UE can keep the mobility management back-off timer running, if the authentication procedure is not performed successfully, e.g., the UE determines that the paging signaling is transmitted by a fake network. For example, the UE can store a remaining time of the mobility management back-off timer, after receiving the paging signaling. Then, the UE restarts the mobility management back-off timer with the remaining time, if the authentication procedure is not performed successfully.

Thus, according to the process 30 and the above description, the UE can handle the mobility management back-off timer properly whether the authentication procedure is performed successfully.

Figure 4:
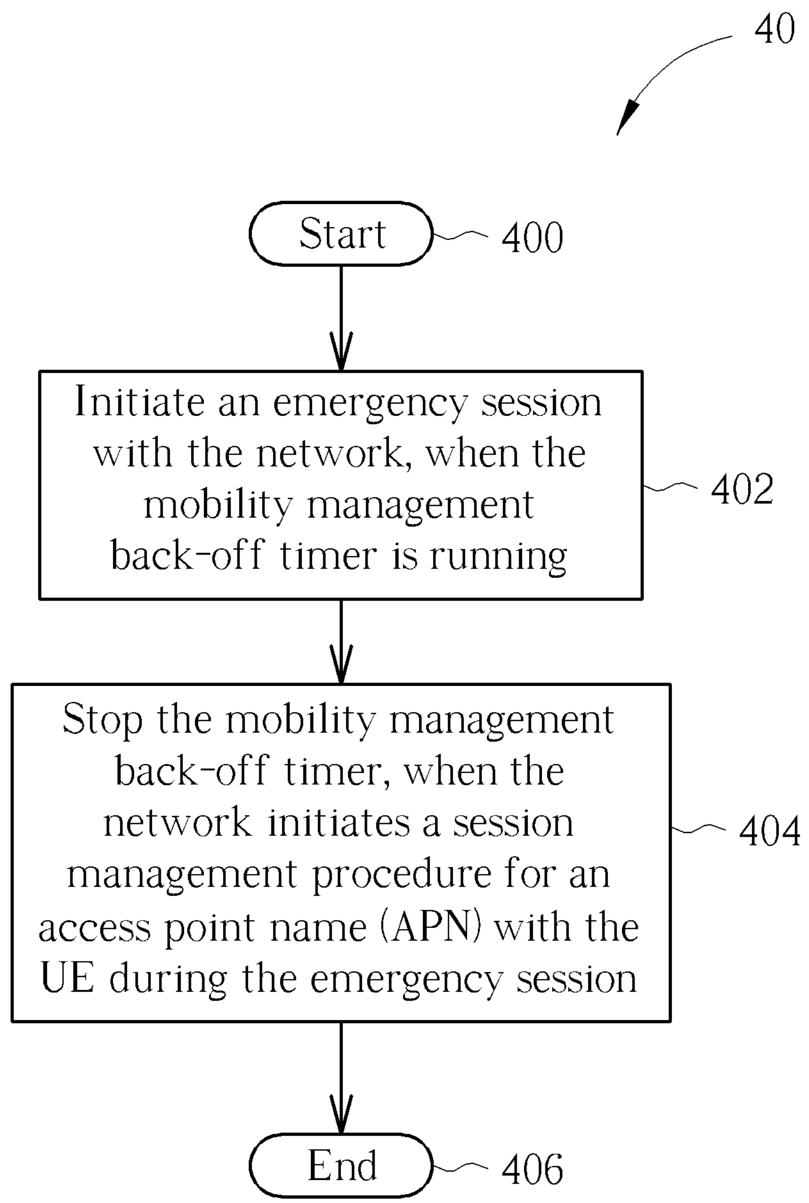
FIG. 4 is a flowchart of a process according to an example of the present invention.

Please refer to FIG. 4, which is a flowchart of a process 40 according to an example of the present invention. The process 40 is utilized in a UE shown in FIG. 1, for handling a mobility management back-off timer. The process 40 may be compiled into the program code 214 and includes the following steps:

Step 400: Start.

Step 402: Initiate an emergency session with the network, when the mobility management back-off timer is running.

Step 404: Stop the mobility management back-off timer, when the network initiates a session management procedure for an access point name (APN) with the UE during the emergency session.

Step 406: End.

According to the process 40, the UE initiates an emergency session (e.g., for an emergency call) with the network during that the mobility management back-off timer is running. If the network initiates a session management procedure for an APN (i.e., for establishing a packet data protocol (PDP) context for the APN) with the UE during the emergency session, the UE stops the mobility management back-off timer. For example, the network may initiate the session management procedure with the UE by sending a session management signaling to the UE. The UE stops the mobility management back-off timer after receiving the session management signaling. Further, the UE can transmit a session management response to the network when the emergency session is completed (or even during the emergency session), for responding to the session management signaling. The mobility management back-off timer can be a T3346 timer defined in the 3GPP standard. For example, the network may initiate the session management procedure with the UE by sending a session management signaling to the UE. The UE stops the mobility management back-off timer after receiving the session management signaling. Further, the UE can transmit a session management response to the network when the emergency session is completed (or even during the emergency session), for responding to the session management signaling. The mobility management back-off timer can be a T3346 timer defined in the 3GPP standard.

Thus, according to the process 40 and the above description, the UE will not loss ongoing radio bearer when changing a routing area during the emergency session. Besides, the UE can resume a service during the emergency session, since the mobility management back-off timer is stopped.

Those skilled in the art should readily make combinations, modifications and/or alterations on the abovementioned examples. The abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), and the communication device 20.

To sum up, the present invention provides a method of handling a mobility management back-off timer. A problem that a fake network may transmit a paging signaling to a UE to stop the mobility management back-off timer of the UE is solved. Besides, a problem that a UE may loss ongoing bearer and services during an emergency session due to the mobility management back-off timer is also solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling a mobility management back-off timer for a mobile device in a wireless communication system, the method comprising:

performing a mobility management procedure in response to a paging signaling transmitted by a network of the wireless communication system;

storing a remaining time of the mobility management back-off timer, after receiving the paging signaling;

stopping the mobility management back-off timer only when an authentication procedure is successfully performed in the mobility management procedure; and restarting the mobility management back-off timer according to the remaining time, if the authentication procedure is not performed successfully.

2. The method of claim 1, wherein the mobility management back-off timer is a T3246 timer or a T3346 timer defined in the 3rd Generation Partnership Project (3GPP) standard.

3. The method of claim 1, wherein the mobile device determines that the authentication procedure is performed successfully, after receiving a security mode command from the network, for enabling a plurality of security parameters obtained during the authentication procedure.

* * * * *